L. Wells,
Making Staves.
Nº 582.  Patented Jan. 27, 1838.
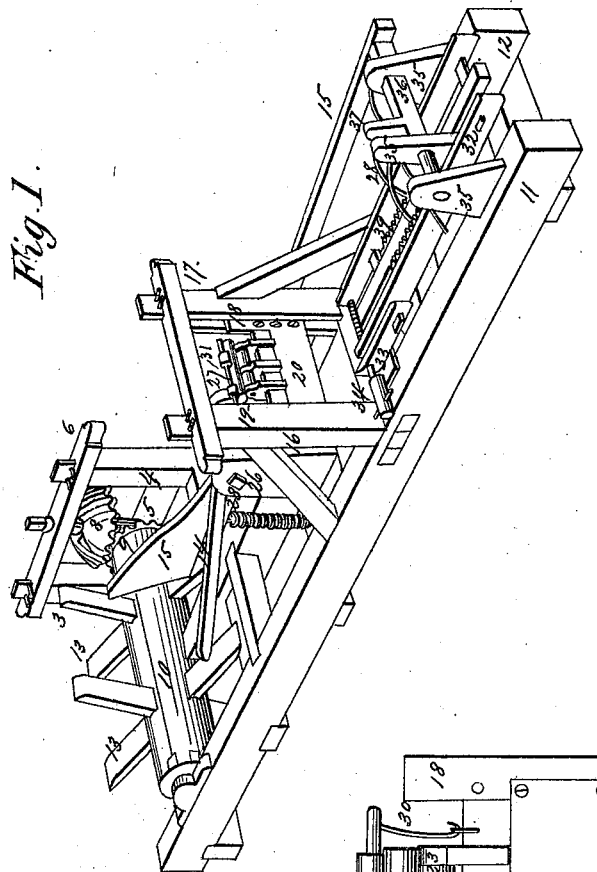

UNITED STATES PATENT OFFICE.

LEE WELLS, OF HARTSVILLE, NEW YORK.

MACHINE FOR CUTTING HEADING FOR CASKS FROM SATURATED TIMBER.

Specification of Letters Patent No. 582, dated January 27, 1838; Antedated July 27, 1837.

*To all whom it may concern:*

Be it known that I, LEE WELLS, of the village of Hartsville, town of Manlius, county of Onondaga, and State of New York, did in January 1837, invent a new Improvement on George Pack's Patent Stave-Machine, the improvement being such that the machine will cut heading for casks of all kinds; and I do declare that the following is a full and clear description.

The nature of my invention consists in providing the above machine with a knife gate with cast or wrought iron friction rollers with swivel irons rod and boxes to raise said gate perpendicular, thereby cutting the heading straight and of a suitable width contrary to what the machine would cut previous to attaching my improvement namely cutting on a curve and narrow.

To enable others skilled in the art to make and use my invention I will proceed to describe its construction and operation.

The formation of the machine consists first of two pieces of timber 1, 2 laying on the ground horizontally with one another about 4 feet apart. In one end of those sills I set a frame upright namely 2 posts 3, 4 framed into the sills with a cross piece 5, 10 inches above the sills with a cap 6 across the top of the posts 18 inches above the other cross piece in the center. Between the posts I have an iron shaft 7 set upright, the foot setting in a box in the lower cross piece and passing through the caps projecting above about 4 inches with a shoe on the top. In the shoe I place lever about 10 feet long one end confined in the shoe the other to attach the projecting power on the upright shaft I attach a cast cog wheel 8 which is to mesh in a similar wheel 9 that is on a horizontal shaft, 10.

I will next proceed to describe the remaining part that is I take two pieces 11, 12 of timber 10 by 12 inches square 12 foot long frame them together with ties so as to make them the distance apart that I want my knife gate wide one end of this frame laying on the bed sills at the opposite end from the driving power. Next I place a wooden shaft 15 feet long on one end being a cast cog wheel the gudgeon resting on the cross piece and directly under the spur wheel in the driving power the other end resting on the main frame with four sets of arms 13 in the shaft passing through the same at right angles, 2 sets for the purpose of raising the main lever 14, the others the feeding lever 15. I next place 2 posts 16, 17 the distance of 6 feet from this shaft upright in the main frame with braces and a groove in each post to receive the knife gate 18, the same being composed of 3 pieces of timber, 2 uprights 18, 18 and 1 cross bar 19, the uprights being made to fit in the grooves of the upright or fender posts, the knife 20 being confined to the gate by bolts. On the cross bar is set 3 cast iron shoes 21, 22, 23 with 2 rollers 24, 25. The end of the main lever 14 bearing on the rollers as it is pressed down the rollers turning to prevent friction about 2 feet from the knife gate. On the side next the shaft is placed 2 upright pieces 26, 27 called ears. The main lever which is 6 feet long confines between those ears by a rod 28 passing through the ears and lever so as to play on a pivot, the long end resting on the main arms through the shaft, the short end on the knife gate or friction rollers, so that when the shaft turns it raises one end of the lever and presses down the knife gate with the other. Then in order to raise the knife gate when the lever drops off the arm, I have 2 irons 29, 30 one on each side of the lever confined to the gate with a link or swivel. On top of the lever is a rod 31 set in boxes and passing over and projecting outside of the lever to receive the 2 links or swivels which pass through each end of the rod with screws to raise the gate up to the lever. I will next proceed to describe the feeding apparatus. On the opposite of the knife gate is a small frame 32 laying on starts set in the main frame to have it move with ease back and forward with a jaw or lip 33 and a wooden screw 34 to confine the blocks that I wish to cut. I will next proceed to describe the manner that it feeds. On the out end of the main frame is 3 uprights 35 with a roller 36 passing through the same one end projecting outside of the machine to receive the feed lever 15. In the roller is a short post 37 that will move back and forth as the roller moves. In that post is an iron hand 38 one end confined to the post the other laying on a rolling iron 39 which is confined to the feed frame. I have another hand which is confined to a stationary post 35′ and connected to hold the feed frame as the moving hand shoves it on the end of the roller projecting place a lever one end confined to the feeding roller, the other end reaching to the small set of arms through the shaft as it the shaft turns and the lever drops off the arms it moves the roller and the post and hand confined far enough for the thickness for one piece of heading while the stationary hand holds it fast. For further description see drawing.

What I claim as my invention and desire to secure by Letters Patent is—

The above described construction of the knife gate in combination as above described.

LEE WELLS.

Witnesses:
BEN. D. FRENCH,
EDWARD L. JONES.